United States Statutory Invention Registration [19]

[11] Reg. Number: H463

Bollens [43] Published: May 3, 1988

[54] CARBURETOR SPRING RETAINER CLIP

[75] Inventor: Robert F. Bollens, Detroit, Mich.

[73] Assignee: Ford Motor Company, Dearborn, Mich.

[21] Appl. No.: 712,068

[22] Filed: Mar. 15, 1985

[51] Int. Cl.[4] ..... F16B 21/18

[52] U.S. Cl. ..... 411/520; 24/339; 411/87

[58] Field of Search ..... 411/81, 87, 88, 90–92, 411/96–101, 520; 261/DIG. 38; 24/115 A, 30.5 W, 129 W, 20 CW, 23 W, 339; 403/389–391, 396, 397

[56] References Cited

U.S. PATENT DOCUMENTS

| | | | |
|---|---|---|---|
| 270,877 | 1/1883 | Dunn | 411/87 |
| 339,705 | 4/1886 | Smitten | 24/339 X |
| 428,789 | 5/1890 | Tilden | 411/87 |
| 533,024 | 1/1895 | Smith | 24/339 X |
| 561,604 | 6/1896 | Perry | 411/88 |
| 597,293 | 1/1898 | Lombas | 411/98 |
| 637,426 | 11/1899 | Sparr | 411/87 |
| 1,462,714 | 7/1923 | Marchand | 24/339 X |
| 1,544,627 | 6/1925 | Bateman | 411/87 |
| 1,816,301 | 7/1931 | Sundell | 403/397 X |
| 1,861,151 | 5/1932 | Buschman | 24/339 X |
| 2,474,158 | 7/1949 | Neely . | |
| 3,391,432 | 7/1968 | Du Rocher | 24/339 X |
| 3,636,595 | 1/1972 | Wines | 24/339 X |
| 3,669,491 | 6/1972 | Weslock | 24/339 X |
| 4,346,734 | 8/1982 | Frank | 411/87 |

FOREIGN PATENT DOCUMENTS

| | | | |
|---|---|---|---|
| 1277974 | 9/1968 | Fed. Rep. of Germany | 24/339 |
| 611578 | 7/1926 | France | 411/90 |
| 1411925 | 8/1965 | France | 24/115 A |
| 510671 | 6/1957 | Italy | 24/339 |
| 234262 | 5/1925 | United Kingdom | 24/339 |
| 1146572 | 3/1969 | United Kingdom | 24/339 |

*Primary Examiner*—Deborah L. Kyle
*Assistant Examiner*—Michael J. Carone
*Attorney, Agent, or Firm*—Robert E. McCollum

[57] ABSTRACT

A carburetor with a number of threadedly adjustable fuel/air metering jets, rods or screws is provided with a spring metal flexible retainer clip that surrounds portions of two adjacent metering rods or screws with an interference fit to provide continuous side or lateral compressive forces on the screw threads to prevent backoff of the metering rods or screws during operation of the engine upon which the carburetor is installed due to vibration and temperature changes; the clip consisting of a continuous band of spring steel having reversely bent oppositely located end portions, one portion being formed in the shape of a hook and the other being formed more open to permit the assembly around the pair of adjacent metering rods or screws.

8 Claims, 2 Drawing Sheets

Figure 1:
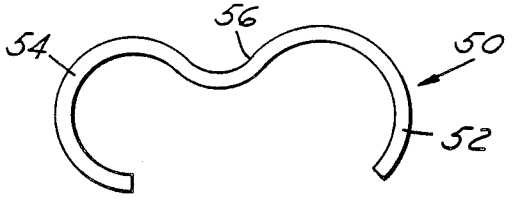

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CARBURETOR SPRING RETAINER CLIP

This invention relates in general to an automotive type carburetor, and more particularly to a spring clip type retainer to prevent backing off of the adjustment screws of the carburetor due to engine vibration once it has been calibrated.

More specifically, the invention relates to a simple C-shaped spring-like retainer clip that is hooked around and bears against the threaded shafts of a pair of adjacent carburetor fuel/air metering valves or screws to prevent the same from backing off during engine operation, which would change the fuel/air ratio of the mixture being suppled to the engine.

In particular, carburetors usually are provided with at least a primary idle jet located adjacent a main fuel metering assembly, each of which are threaded into a well or channel in the carburetor body at predetermined locations to accurately determine the correct flow of air and fuel through the carburetor. If, because of vibration or other causes, the metering valves or screws back off even slightly, the air/fuel ratio will change.

The invention eliminates this problem by providing a flexible spring metal retainer clip around the adjacent metering valves or screws to force thread engagement thereof with the carburetor body with a compressive force designed to prevent rotation of the shafts during normal operation of the carburetor and engine.

It is a primary object of the invention, therefore, to provide a flexible spring metal retainer clip having essentially a C-shape to be hooked around a pair of carburetor air/fuel metering valves or screws in a manner to prevent rotation of the valves or screws due to engine vibration or other causes.

The use of metal clips to prevent back-off of threaded elements per se is well known. However, in most instances, the force of the clip is not applied directly against the thread portion of the elements, nor is it generally a compressive spring force. For example, U.S. Pat. No. 428,789, Tilden, shows a nut lock in which a one piece wire with closed ends is placed over a pair of adjacent shafts and the nuts threaded thereon. The nuts compress on the wire to apply a lateral force to the undersurface of the nut.

U.S. Pat. No. 270,877, Dunn, shows a one piece curved spring with closed loop type ends engaging a pair of adjacent bolt shafts, the central portion of the spring being sprung to effect a vertical frictional force on the underside of the nuts to resist unthreading of the nut.

U.S. Pat. No. 1,544,627, Bateman, and U.S. Pat. No. 4,346,734, Frank, illustrate other types of spring members that engage and surround the flats of nuts to prevent rotation of the same.

U.S. Pat. No. 637,426, Sparr, shows a nut lock in which a thin wire is inserted into the grooves of the threaded portions of the shaft, and adjacent central portions are hooked together upon assembly to provide a tension resisting unthreading of the nuts.

U.S. Pat. No. 2,474,158, Neeley, shows a one-piece clip of the flat, spring metal type, having large and smaller hook-like end portions with the larger portion rigidly fixed to the element and the smaller portion springably movable away therefrom to serve as an attaching member.

Essentially all of the above devices are nut locks for use with member connecting bolt and nut type connections. None is for use with a threadedly adjustable shaft. None consists of a simple spring-type retainer clip that surrounds and bears against two adjacent shafts with an interference fit that provides a compressive force sufficient to prevent backing off or rotation of the shafts. The invention provides a simple one piece continuous flat spring steel retainer clip with reversely bent end portions for engaging adjacent threaded shafts of metering valves or screws in a manner to effectively prevent rotation of the shafts due to vibration or other causes during operation of the engine upon which the carburetor is installed.

Figure 2:
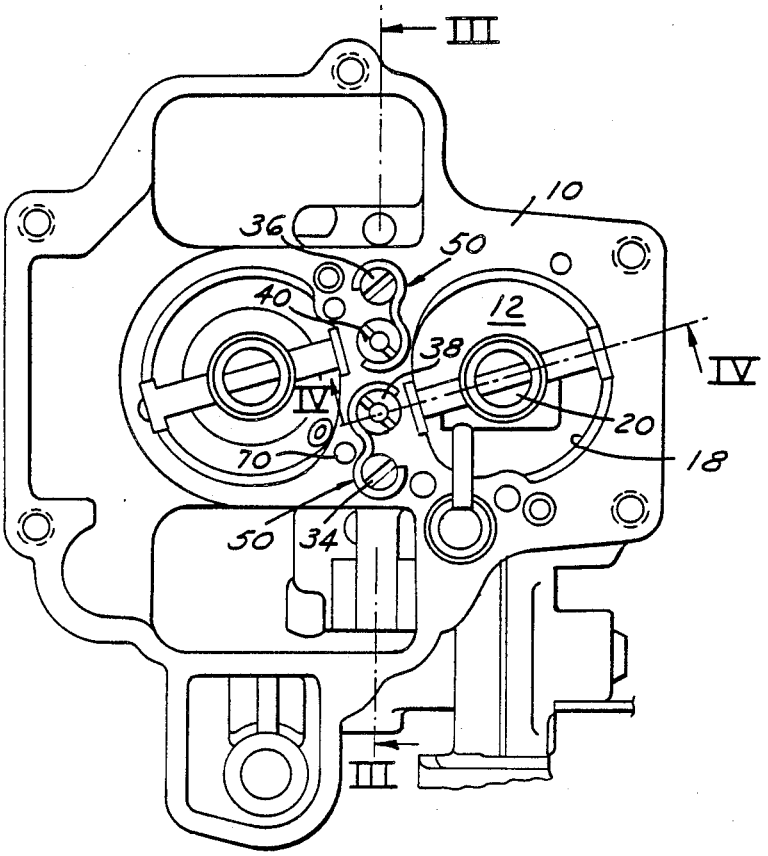
Figure 3:
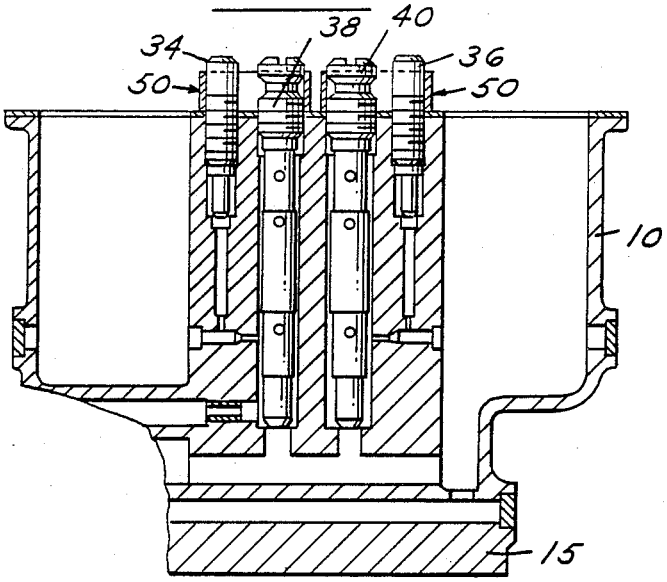
Figure 4:
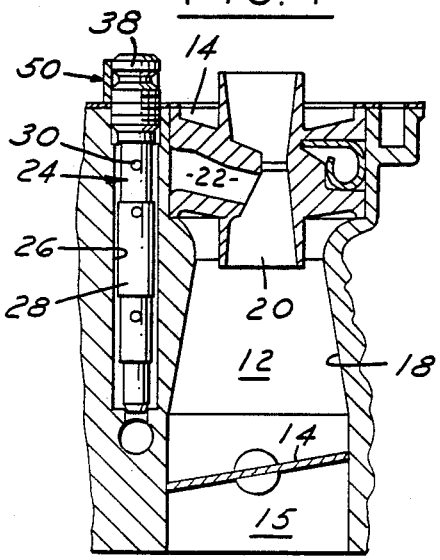

Other objects, features and advantages of the invention will become more apparent upon reference to the succeeding detailed description thereof, and to the drawings illustrating the preferred embodiment thereof; wherein FIG. 1 is an enlarged cross-sectional view of a flexible spring retainer clip embodying the invention;

FIG. 2 is a plan view of a carburetor in which a spring retainer clip embodying the invention is installed; and FIGS. 3 and 4 are cross-sectional views taken on planes indicated by and viewed in the direction of the arrows III—III and IV—IV, respectively, of FIG. 1.

FIGS. 2–4 show portions of a downdraft type carburetor. It the usual main body 10 within which is provided an air/fuel induction passage 12 open at its upper end to air at essentially atmospheric pressure discharged through an air cleaner (not shown). It would be flanged at its lower end 15 for attachment over the intake manifold of an automotive type internal combustion engine (not shown) to subject induction passage 12 to the changes in manifold vacuum levels in a known manner.

Induction passage 12 contains a butterfly type throttle valve 14 at its lower end that is pivotally mounted in the side walls of the carburetor for a rotatable movement across the passage from the essentially closed idle speed position shown to various more vertical open positions in response to demands by the vehicle operator. The induction passage also contains the usual fixed area venturi 18 and a boost venturi 20 through which the main supply of fuel to the engine is obtained during part throttle and wide open throttle conditions of operation.

Fuel is supplied to boost venturi 20 through a passage 22 connected to a main metering assembly 24. The latter is located in a main fuel metering channel 26 and includes an air/fuel mixture tube 28 of a diameter that controls the flow of fuel between it and channel 26. The mixture tube is provided with a number of air emulsifier holes 30 through which air is drawn to atomize the fuel. The upper end of the mixture tube is threaded to permit adjustment of the position of the tube and, therefore, the flow volume of fuel.

FIGS. 2 and 3 show the carburetor as having a pair of induction passages 12 each with a fixed area venturi and a boost venturi. It also has primary and secondary idle jet screws 34 and 36 and threaded primary and secondary fuel metering rods 38 and 40, each controlling the flow through various passages. In each case, the metering rods, valves or screws are threaded for adjustably positioning the member. It will be clear that once calibrated, the screws should remain in their set positions; otherwise, the ratio of fuel and air flow to the engine would drift or vary over a period of time. Vibration of the engine, for example, could cause a backing off of the screws or valves from their initial set positions, thereby requiring a recalibration of the carburetor.

The invention provides a flexible spring retainer clip to prevent such a backing out of the screws or metering valves. More particularly, FIG. 2 is a plan view of an essentially C-shaped flexible spring metal clip 50 constructed according to the invention. As seen in the figures, it comprises a continuous strip of flat spring steel, having reversely bent opposite end portions 52, 54 interconnected by a central body portion 56. In this particular case, the clip is adapted to bear against and partially surround an extension of the threaded shaft of both the idle jet and adjacent main metering rod. While the two are shown in this instance of differing diameters, it will be clear that the clip would be equally applicable to two adjacent metering rods or threaded members of equal diameter, the only difference then being that the opposite open ends would be of equal diameter.

In the case shown in the figures, the smaller diameter, essentially semi-circular, open end portion 54 extends circumferentially for approximately 180° from the central connecting portion to a hook shape that initially would be engaged around the one threaded shaft. The opposite larger diameter end portion 52 of the clip is more open and extends circumferentially from the central portion for less than 180° or approximately 45° less than portion 54 to enable it to be sprung outwardly or bent arcuately to enable it to be assembled around the larger diameter threaded shaft of the adjacent metering jet.

The longitudinal extent of the clip in this case is slightly less than the distance between the radially outermost or diametrically opposite portions of the adjacent shafts to which it is assembled. This is to provide an interference fit between the two, thereby establishing upon assembly a continuous compressive force acting directly against the threads of the two shafts to thereby resist any rotation of the two.

The central body portion 56 of the clip is shown as having essentially a V-shape; however, this is primarily to accommodate and avoid interference with bleed hole 70 of the carburetor after assembly of the clip to the two adjacent shafts. It will be clear that the central portion could be straight or bent otherwise for other applications without departing from the scope of the invention.

As seen in FIG. 3, the metering rods or screws each extend or project axially out of the carburetor body. The flat portion of the clip is designed to extend axially over essentially the same distance to provide a frictional compressive force to each of the metering shafts which it surrounds.

The operation is believed to be clear from the above description and from a consideration of the drawings and, therefore, will not be given in detail. Suffice it to say, however, that the hook portion 54 of clip 50 first engages flat around and against the one threaded shaft portion and the more open other end portion 52 and body portion 56 then is cantilevered or sprung outwardly to clear the other shaft and released to permit assembly around and flat against the threads of the adjacent shaft. The interference fit of the clip to the two shafts provides a continuous compressive force that is transmitted along the axial extent of the shafts to the threaded portions of the shafts in the carburetor body, and thereby provide a force that is highly resistive of rotation to maintain the metering valves or screws in their set calibrated positions regardless of a tendency of the latter to back off to other positions due to engine vibrations and temperature changes.

While the invention has been shown and described in its preferred embodiment, it will be clear to those skilled in the arts to which it pertains that many changes and modifications may be made thereto without departing from the scope of the invention.

I claim:

1. A carburetor for an automotive type engine, the carburetor having a pair of adjacent air/fuel induction passages, a pair of threaded fuel channels adjacent one another, each having a threaded part at one end and each opening into an induction passage at the other end, a fuel metering rod axially movably receivable in each fuel channel and having threads on one end engagable with the threaded part of the fuel channel for an axial adjustability of the rod, the threaded portion of the one end of each rod having a portion thereof projecting out of its fuel channel to a position above the carburetor, and a flexible spring type retaining clip engagable simultaneously with the threads of each threaded rod portion projecting out of the fuel channel with a frictional interference fit sufficient to prevent inadvertent rotation of the threads and rods due to engine vibration or the like during engine operation, the clip comprising a continuous piece of flat deformable spring metal having a longitudinally extending central portion interconnecting spaced reversely bent open end portions adapted to circumferentially engage and surround portions of the threads of the threaded rods, the longitudinal extent of the clip being slightly less than the distance from diametrically opposite sides of the metering rods to provide the interference fit between the clip and the rods upon the yieldable deformation of the clip during assembly over the threads of the pair of metering rods to provide a continuous compression force acting directly against the threads resisting rotary movement of the rods.

2. A carburetor as in claim 1, wherein the metering rods are of differing diameters and one of the clip open-end portions is of a larger diameter than the other for mating with the differing diameter metering rods.

3. A carburetor as in claim 1, wherein one open end portion of the clip extends circumferentially more than the other end portion providing a more open attitude to the other end portion whereby the one end portion may be hooked around the threads of the projecting portion of one of the metering rods and the other end portion subsequently arcuately sprung around the threads of the other metering rod projecting portion.

4. A carburetor as in claim 3, wherein the one end portion extends circumferentially approximately 180° from the central portion while the other end portion extends circumferentially less than 180° from the central portion.

5. A carburetor as in claim 3, wherein the open end portions face one another with the one end portion being essentially semi-circular, the other end portion being less than semi-circular to provide ease of assembly onto the metering rod.

6. A carburetor clip as in claim 1, wherein the clip is of flat spring steel with open-end portions reversely bent to one another and a V-shaped interconnecting portion.

7. A carburetor for an automotive type engine, the carburetor having a pair of adjacent air/fuel induction passages, a pair of threaded fuel channels adjacent one another, each having a threaded part at one end and each opening into an induction passage at the other end, a fuel metering rod axially movably receivable in each fuel channel and having threads on one end engagable with the threaded part of the fuel channel for an axial adjustability of the rod, the threaded portion of the one end of each rod having a portion thereof projecting out of its fuel channel to a position above the carburetor, and a flexible spring type retaining clip engagable simultaneously with the threads of each threaded rod portion projecting out of the fuel channel with a frictional interference fit sufficient to prevent inadvertent rotation of the threads and rods due to engine vibration or the like during engine operation, the clip comprising a continuous piece of flat deformable spring steel having essentially a C-shape defined by a central body portion interconnecting a substantially semi-circular hook portion formed at one end and a less than semi-circular open-like end portion formed at the other end, the two end portions facing one another, the longitudinal extent of the clip being less than the distance between the least adjacent portion of the threads of the pair of rods thereby providing the interference fit between the clip and the rods, the one hook end portion being assembled in a flat parallel manner against and encircling the threads of the projecting portion of one of the metering rods while the other end portion is assembled in a flat parallel manner against and partly encircling the threads of the projecting portion of the other metering rod subsequent to the springing outwardly thereof to an extent enabling the assembly thereof to the other rod, the release and return of the other end towards its free state applying a continuous compressive force on the threads resisting rotary movements of the rods.

8. A carburetor as in claim 1, the clip extending axially for the extent of the projecing portion.

* * * * *